United States Patent [19]
Keiper

[11] Patent Number: 5,320,141
[45] Date of Patent: Jun. 14, 1994

[54] FLOW CONTROL VALVE

[76] Inventor: Raymond Keiper, 1317 3rd St., North Catasauqua, Pa. 18032

[21] Appl. No.: 8,580

[22] Filed: Jan. 22, 1993

Related U.S. Application Data

[63] Continuation-in-part of Ser. No. 803,987, Dec. 9, 1991, Pat. No. 5,183,077.

[51] Int. Cl.$^5$ .............................................. F16K 1/16
[52] U.S. Cl. ...................................... 137/875; 137/872
[58] Field of Search ................................. 137/875, 872

[56] References Cited

U.S. PATENT DOCUMENTS 3,545,470  12/1970  Paton ............................. 137/875 X

FOREIGN PATENT DOCUMENTS

901538  7/1962  United Kingdom ................ 137/875
1182381  2/1970  United Kingdom ................ 137/875

*Primary Examiner*—John Rivell
*Attorney, Agent, or Firm*—Terry M. Gernstein

[57] ABSTRACT

A flow control valve includes a body having a hollow central section into which a flow control body fits. Three fluid flow ports are defined in the central section in a Y-shaped configuration to include a trunk port and two branch ports, and two flow ports are defined in the flow control body. The flow control body is moved from one orientation fluidically connecting one fluid port to one of the branch ports and the second port to the trunk port and a second orientation fluidically connecting the one fluid port to the trunk port and the second fluid port to the other one of the branch ports. Another form of the flow control valve includes a keystone shaped flow control body. The flow control valve can be used in a fluid circuit connecting a fluid source to various ones of a plurality of fluid flow driven subsystems.

10 Claims, 11 Drawing Sheets

FLOW CONTROL VALVE

The present application is a continuation-in-part of prior application Ser. No. 07/803,987, filed Feb. 9, 1991, now U.S. Pat. No. 5,183,007 the disclosure of which is incorporated herein by reference.

TECHNICAL FIELD OF THE INVENTION

The present invention relates to the general art of flow control elements, and to the particular field of flow control valves.

BACKGROUND OF THE INVENTION

Many workshops include a plurality of fluid-driven systems. Such systems include a shop vacuum, saws, drills, grinders and so forth. These shops generally have a single source of fluid. When each system is used, it must be connected to the fluid source.

Connection of a system to a fluid source can be a difficult procedure in which one system is disconnected from the fluid source and another system is connected to that fluid source. This can be time consuming and may require a worker to stop work to make this disconnection and connection.

Furthermore, once connected, it may be difficult to properly regulate the amount of fluid flowing to the connected system. Still further, it may not be possible to easily connect several systems to a single fluid source while still regulating the amount of fluid flowing to each system.

Accordingly, there is a need for a flow control valve which can be used to efficiently connect a source of fluid to one or several fluid-driven systems, while still providing accurate flow rates for each system. The incorporated application disclosed a flow control valve which effectively overcame the above-mentioned problems. However, there is still room for improvement in this flow control valve.

OBJECTS OF THE INVENTION

It is the object of the present invention to improve the flow control valve disclosed in the incorporated application.

SUMMARY OF THE INVENTION

These, and other, objects are achieved by a flow control valve that includes a body having a central section to which three fluid ports are connected. The central section fluid ports are arranged in a pattern to form a planar Y-shape, with one port being a trunk port and the other two ports forming branch ports. A control body is located inside the central section and includes means for fluidically connecting the trunk port to a selected one of the branch ports. A control body moving means is fixed to the control body to move that body so one fluid port remains in contact with the trunk port, while the other fluid port is moved from fluid connection with one branch port to fluid connection with the other branch port. The control body includes a stop element engaging portion so the control valve can be used to meter the amount of fluid flowing between the trunk port and the selected one of the branch ports.

Two forms of the control body are disclosed. One form includes a spherical outer shape and the other form includes a keystone shape and acts like a blast deflector plate to direct flow from the trunk port to the selected branch port.

Several flow control valves can be connected together to form a fluid circuit in which several fluid-driven systems are all connected to a single fluid source. The various valves of the circuit are manipulated to control the amount of fluid flowing to each system.

In this manner, one fluid source can be used to drive several systems, and each system can receive the exact amount of fluid necessary to operate efficiently. However, connection of any single system to the fluid source is easy and expeditious.

DETAILED DESCRIPTION OF THE PREFERRED EMBODIMENT OF THE INVENTION

Figure 1:
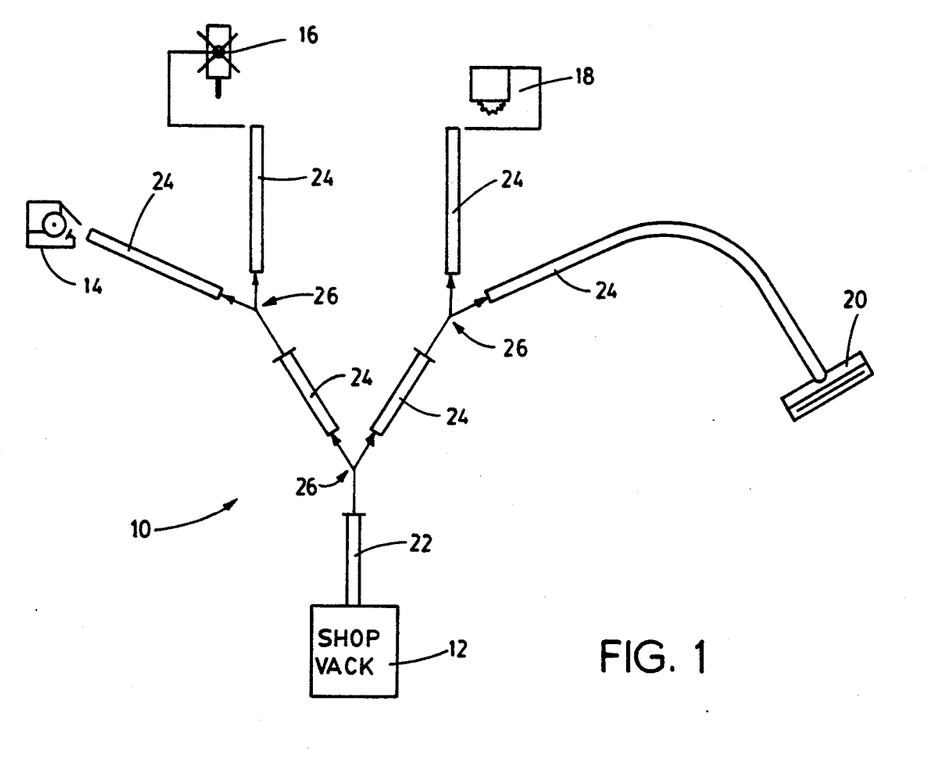
FIG. 1 illustrates a flow circuit in which a single fluid source can supply any or several different fluid-driven systems.

Shown in FIG. 1 is a fluid circuit 10 in which a fluid source 12 is fluidically connected to a plurality of fluid-driven systems, such as a grinder 14, a drill 16, a saw 18 and a shop vacuum attachment 20 are connected. As will occur to those skilled in the art, the term "source" can be used to mean a "sink" as well. Just to the source causes fluid to flow in a manner to drive a fluid-driven system.

The fluid source 12 is fluidically connected to the various systems by fluid conduits such as outlet conduit 22 and connection conduits 24. Movement of the fluid through the circuit is controlled by flow control valves 26 fluidically connected to the conduits of the circuit. The flow control valves 26 embody the present invention.

Figure 2:
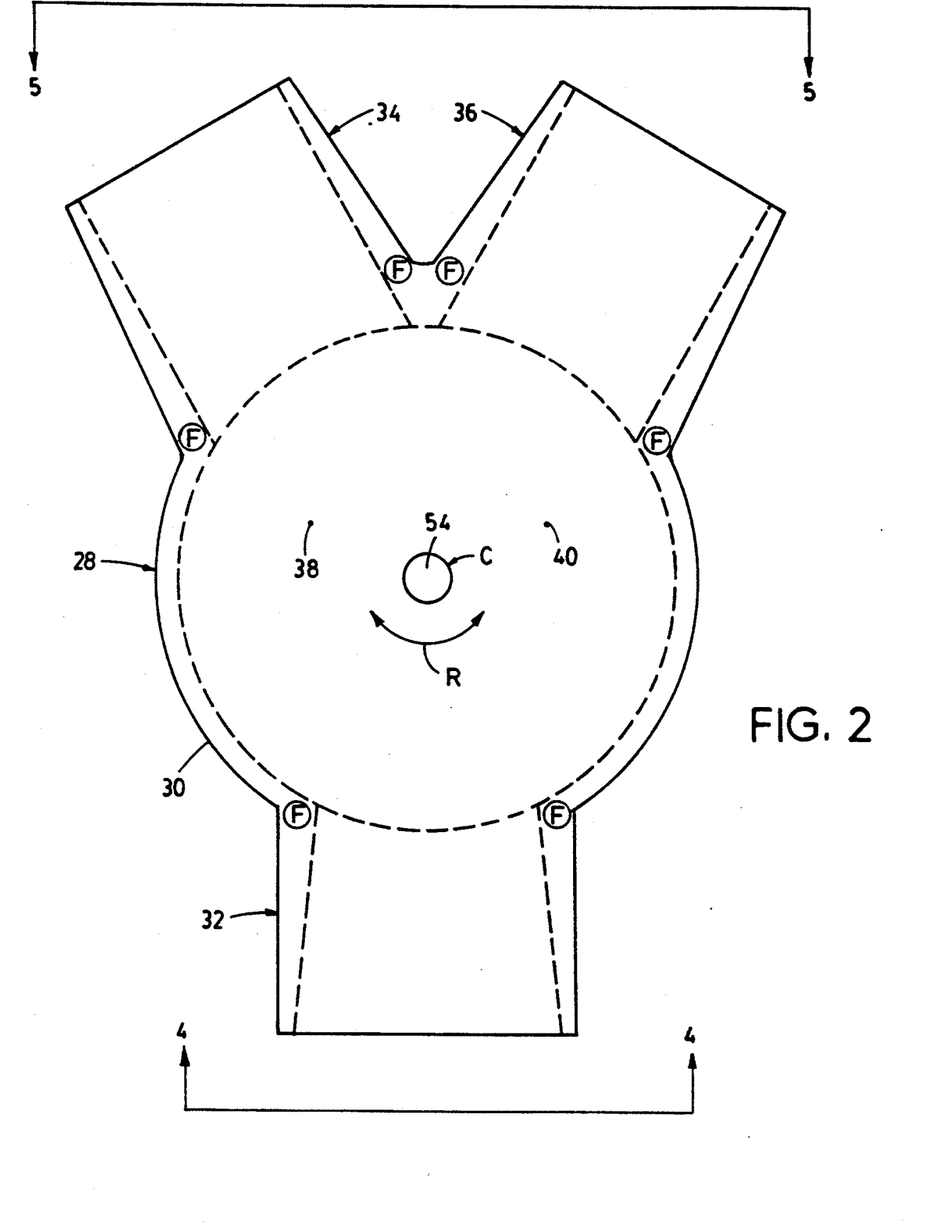
FIG. 2 is a top plan view of a flow control valve embodying the teaching of the present invention.
Figure 3:
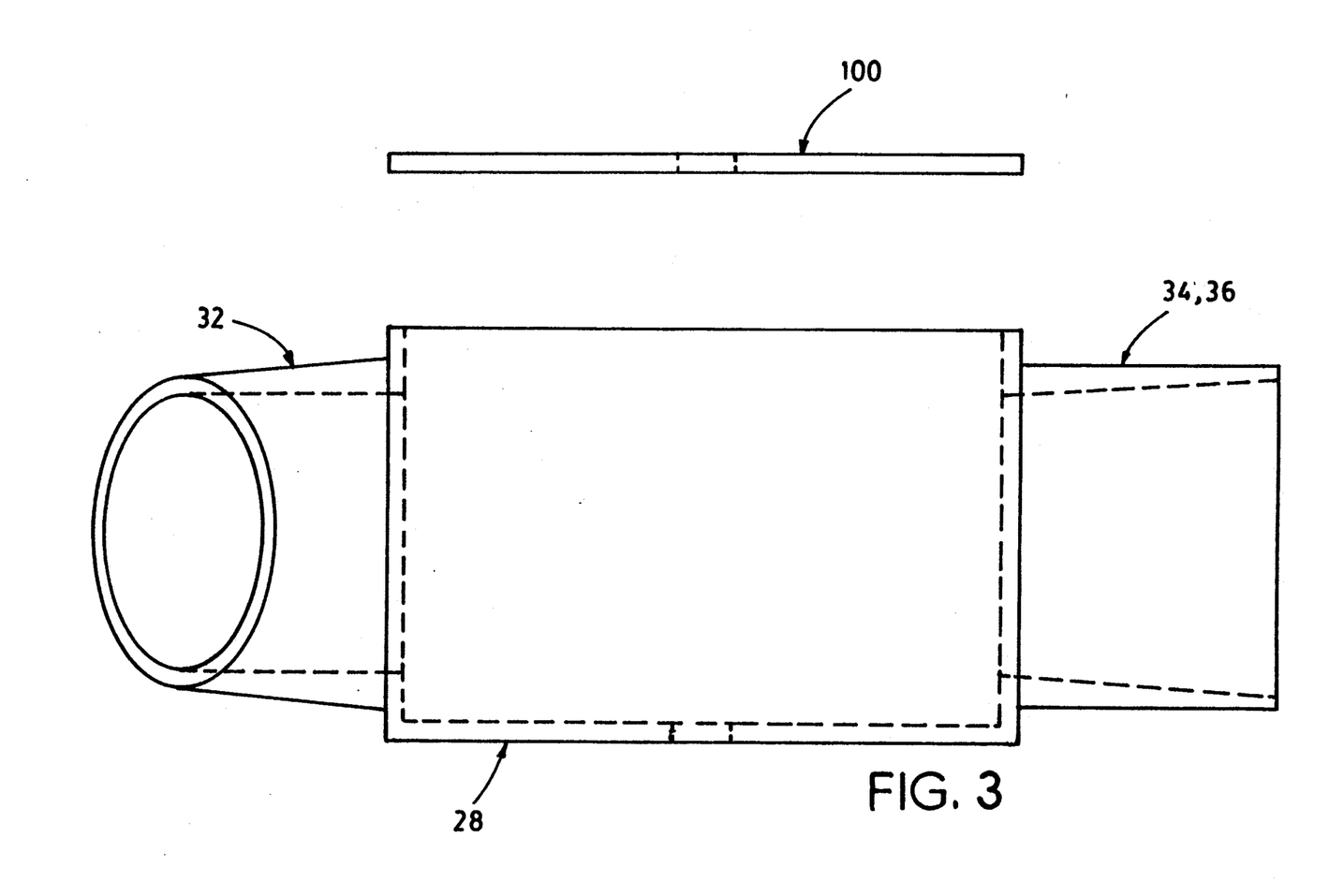
FIG. 3 is a side elevational view of the flow control valve.
Figure 4:
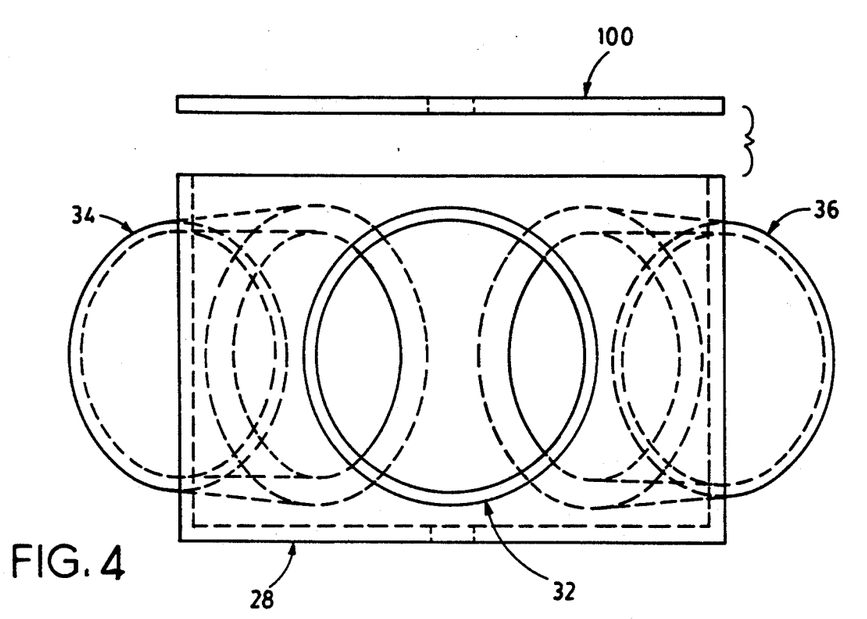
FIG. 4 is an end elevational view of the flow control valve.
Figure 5:
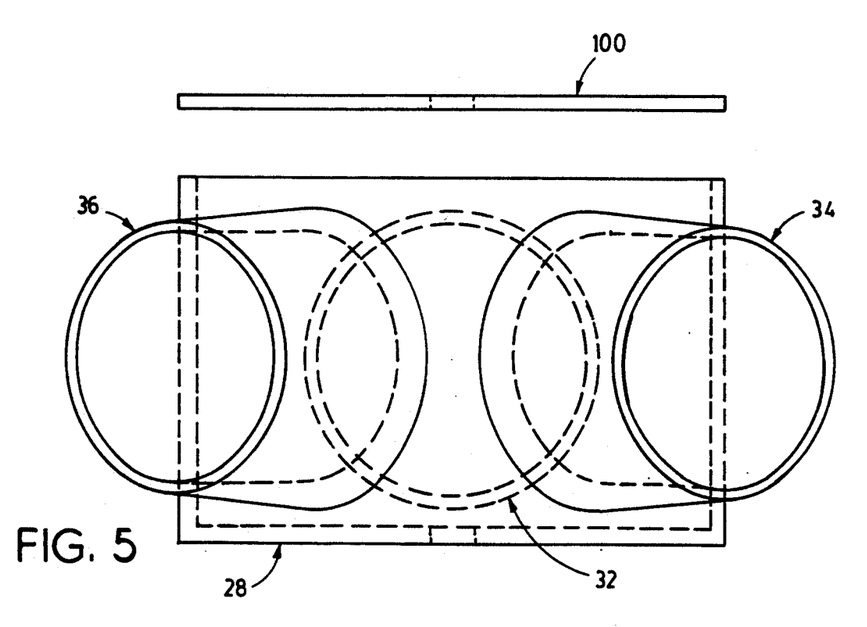
FIG. 5 is an end elevational view of the flow control valve as seen from the end opposite to FIG. 4.

A first form of the flow control valve of the present invention is shown in FIGS. 2–8. The flow control valve includes a body 28 having a hollow spherical central section 30 with fluid ports 32, 34 and 36 fluidically connected thereto to transfer fluid to and from the inner volume of the central body. As is shown in FIG. 2, the three fluid ports are connected to the central body in a Y-shaped pattern, with fluid port 32 being a trunk port and fluid ports 34 and 36 being branch ports. Each fluid port 32, 34 and 36 is connected to one of the fluid conduits 22 or 24. The body 28 further includes two stop elements 38 and 40 mounted thereon. The location of the stop elements will be discussed below. Each of the fluid ports 32, 34 and 36 has a width dimension as measured between locations F shown in FIG. 2 along an arc centered at C on body 28. The body 28 is spherical and thus includes a diameter passing through body center C.

Figure 6:
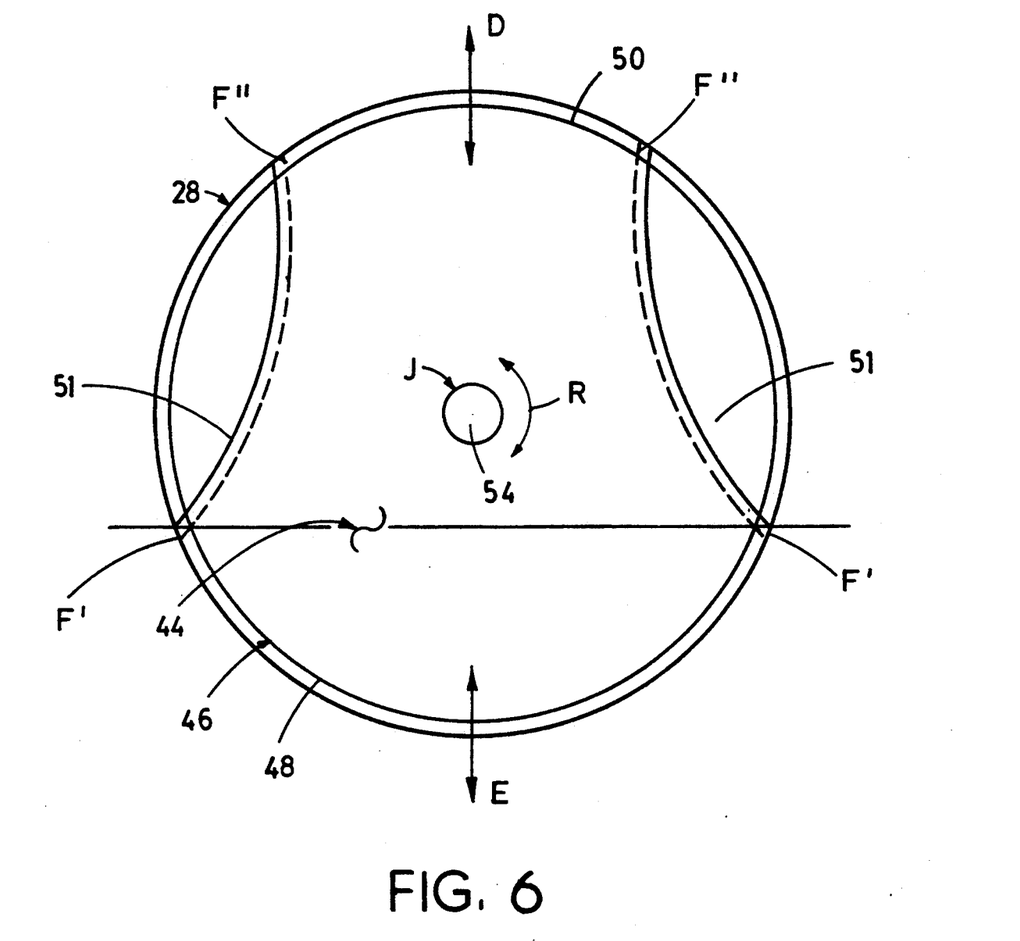
FIG. 6 is a top plan view of a control body used in the flow control valve of the present invention.
Figure 7:
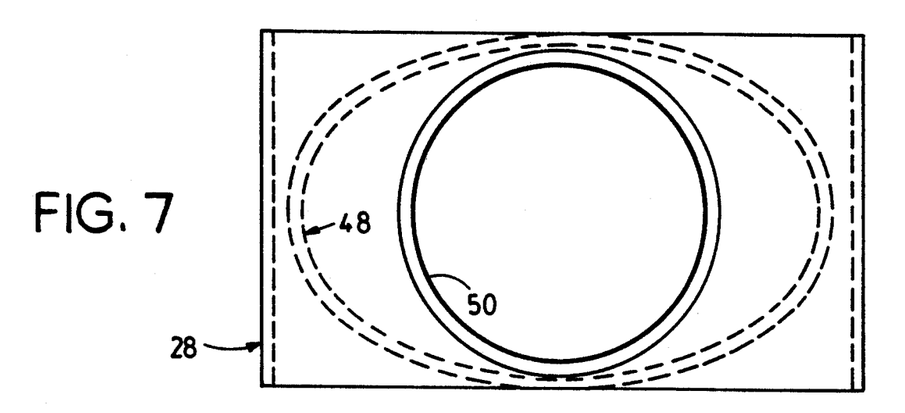
FIG. 7 is an elevational view of the control body.
Figure 8:
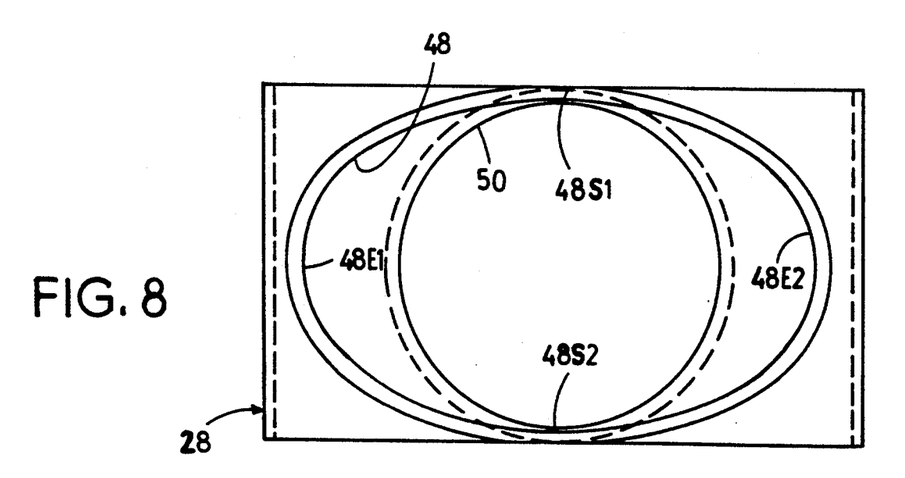
FIG. 8 is an elevational view of the control body as seen from the end opposite FIG. 7.
Figure 9:
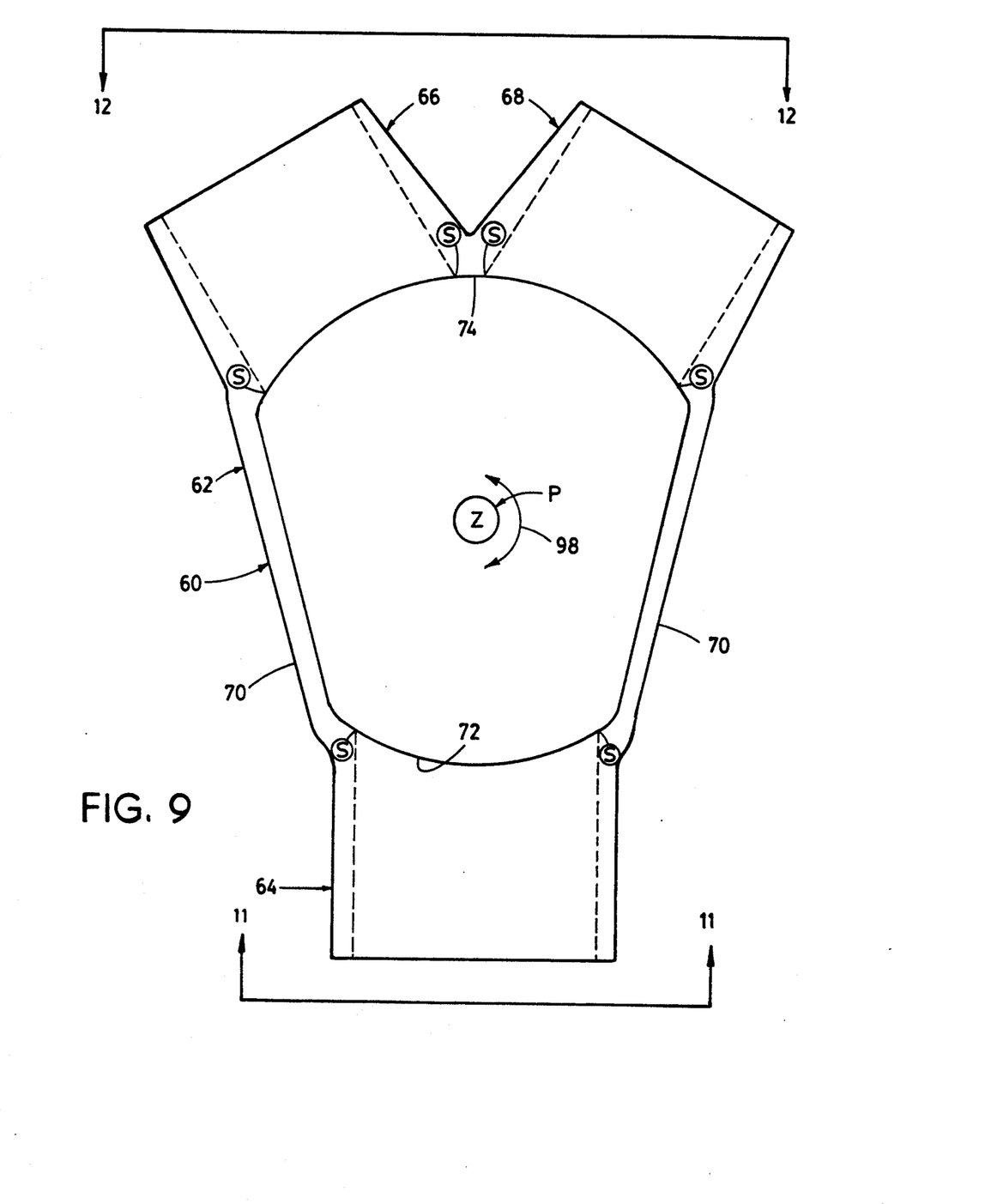
FIG. 9 is a top plan view of a second form of the control valve of the present invention.
Figure 10:
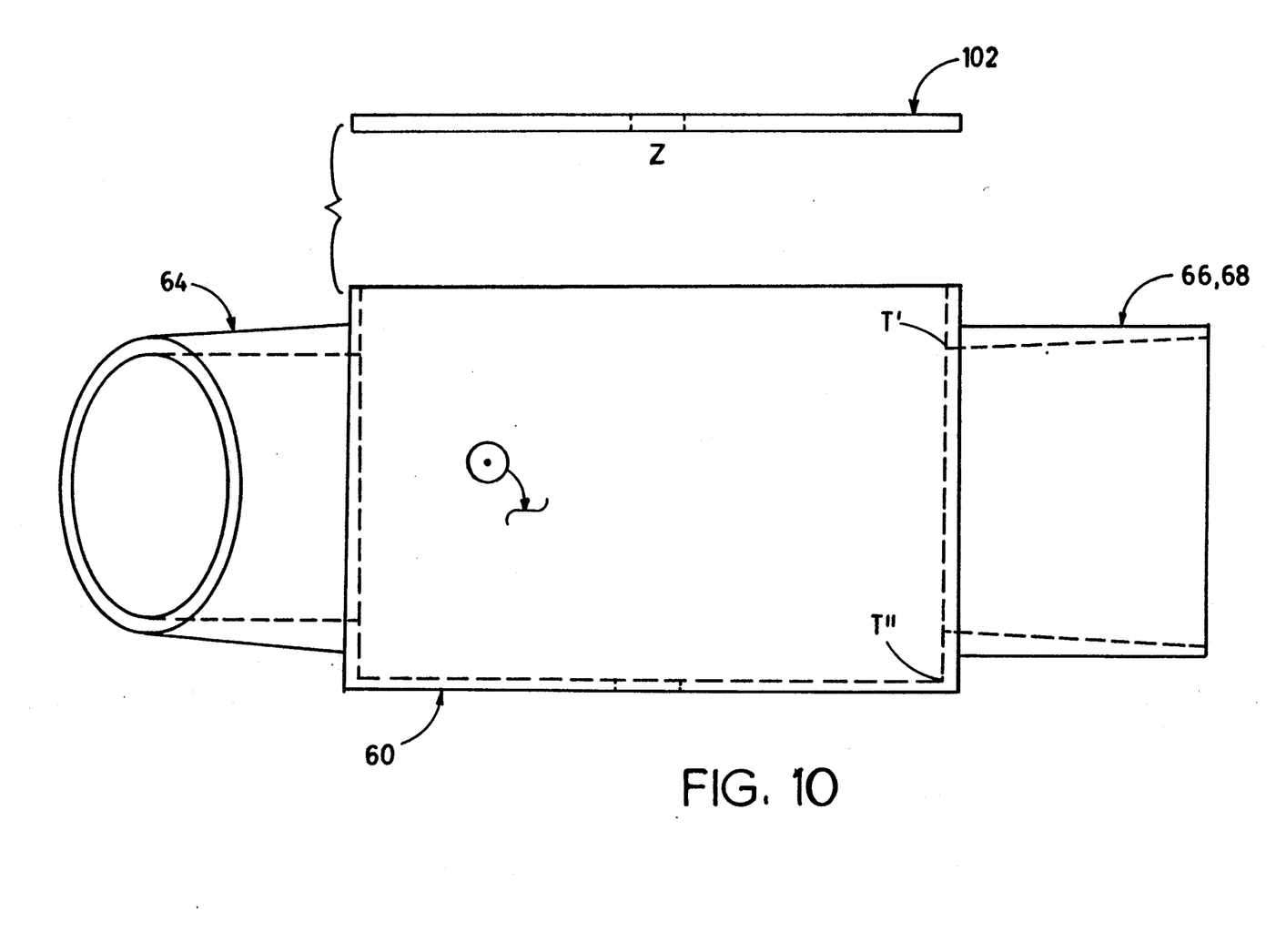
FIG. 10 is a side elevational view of the FIG. 9 control valve.
Figure 11:
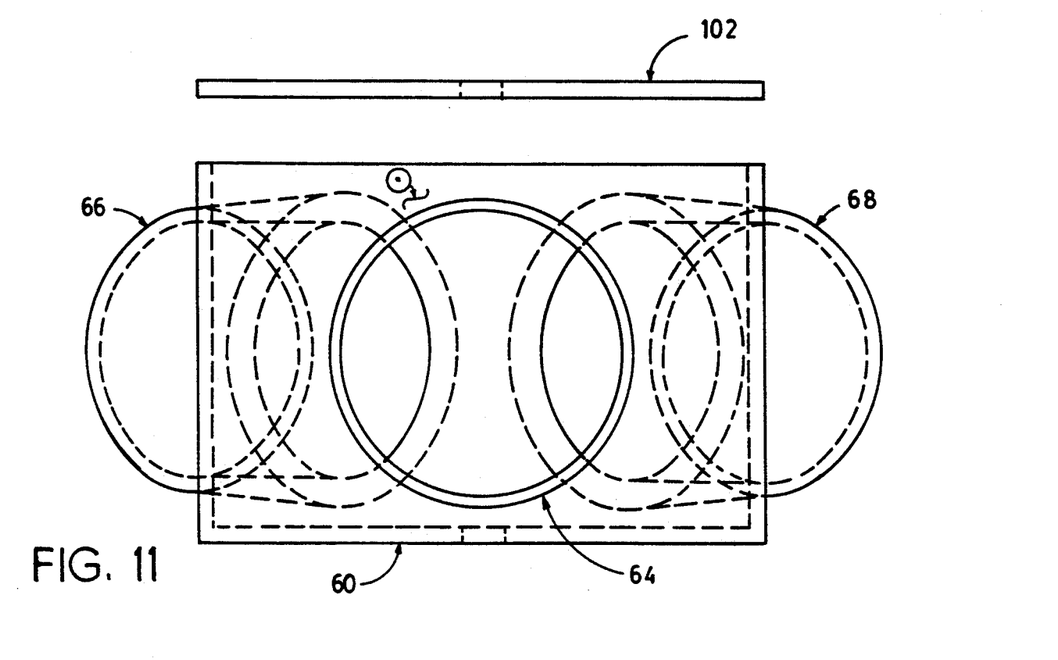
FIG. 11 is an elevational view of the FIG. 9 control valve as seen in plane 11—11.
Figure 12:
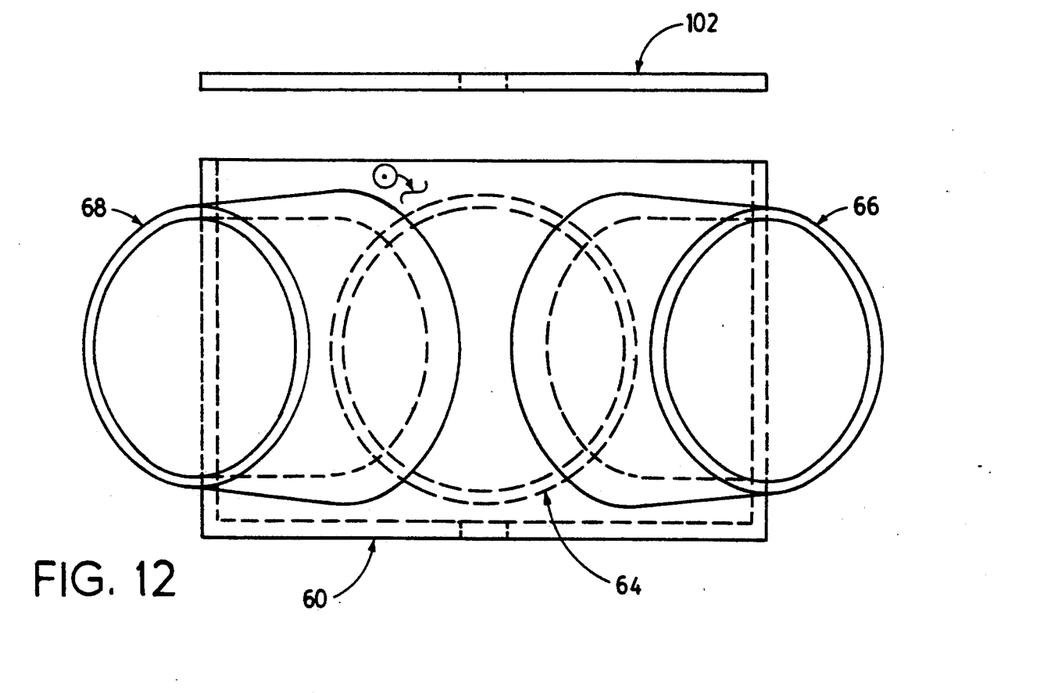
FIG. 12 is an elevational view of the FIG. 9 control valve as seen in plane 12—12.

The flow control valve further includes a central body 44 positioned inside the central section 28. The central body acts as a flow control means to direct fluid flow from the trunk port to a selected one of the branch ports. The central body is preferably steel, and a first form thereof is best shown in FIGS. 6–8. The central body 44 includes a hollow ball 46 having a first port 48 and a second port 50. The body 44 has a center J that is coincident with body center C when the ball is located inside the body 28. The ball has a spherical outer perimeter to match the spherical inner surface of the hollow body 28 and is sized to move inside the body 28 while still engaging that body inner surface. One form of the body 44 has two concave side surfaces 51 and pivots about a rotational axis R defined through center J as was discussed in the incorporated application and as will be understood from the ensuing discussion. The first port 48 has a width dimension as measured along arc F'—F' that is twice the width dimension of the trunk port 32 as that trunk port is measured along arc F—F; whereas, second port 50 has a width dimension as measured along arc F"—F" that is essentially equal to the width dimension of each of the branch ports 34 and 36 as measured along arcs F—F in FIG. 1 at the intersection of each of those branch ports and the body 30. The first port 48 is diametrically opposite to the second port 48 in relation to the diameter of the body 48 passing through body center J.

The central body 44 is mounted within the central section to rotate about axis R that is perpendicular to a plane containing the ports 50 and 52 as indicated by the double-headed arrow in FIG. 6. Rotation of the central body about axis R aligns the second port 50 with a selected one of the branch ports 34 or 36 while maintaining first port 48 in fluid communication with the branch port 32. This establishes fluid communication between the trunk port and the selected branch port while preventing fluid communication between the trunk port and the non-selected branch port.

A central body moving means includes a post 54 fixed to the central body and extending outwardly of that central body a distance sufficient to extend out of the central section as discussed in the incorporated application. The central body further includes a second post 60 which engages the central section to act as a pivot for the central body. The posts can be D-shaped if suitable.

As discussed in the incorporated material, a control knob is fixed to the post 54. The control knob can be Y-shaped with a body portion having a pointed end on one end and a C-shaped tail on the other end. A D-shaped hole can include an arcuate section and a linear section. The post 54 can include a planar section and an arcuate section, with the post planar section being located adjacent to the knob linear section when the control knob is attached to the post. This attachment permits the post 54 to be rotated by movement of the control knob in direction R. It is noted that the hole and post need not be D-shaped, but can be attached to each other in any suitable manner.

As is also discussed in the incorporated material, the control knob section can contact the stop elements located on the body 28 to control movement of the control knob. When the knob contacts one of the stop elements, first port 48 is fluidically aligned with the trunk port 32 and second port 50 is fluidically aligned with branch port conduit 34 whereby fluid is transferred between ports 32 and 34. When the knob contacts the other stop, first port 48 remains fluidically aligned with branch port 32 but is moved, and second port 50 is moved to be fluidically aligned with the other branch port 3 whereby fluid is transferred between conduits 32 and 36 via the fluid path through the central body 44. As can be understood from FIGS. 7 and 8, the relative sizes of the ports 48 and 50 permits the port 48 to remain in fluid contact with the trunk port 32 while the port 50 moves from fluid contacting relation between branch port 34 and branch port 36. The fluid port 48 is oval in shape as is best shown in FIG. 8 and is best described as being prolate and includes two arcuate ends 48E1 and 48E2 connected together by linear sections 48S1 and 48S2. Fluid flow through the body 44 is indicated in FIG. 6 by double-headed arrows D and E, and the inner, fluid-contacting surface of the flow control means is indicated by the dotted lines in FIG. 6. Sliding seals on the flow control body further ensure that no leakage will occur.

In order to permit a user the option of controlling the amount of fluid transferred to the selected system, the flow control valve of the present invention can include a flow selection plate such as was discussed in the incorporated material. The flow selection plate can be moved toward and away from the control knob.

The flow selection plate includes a plurality of notches, that are each sized to receive the pointed end of the knob. The control plate permits a user to select the amount of fluid flowing between the source and the selected system whereby the exact amount of fluid flow for a system can be selected even though a single source is used in conjunction with several systems, each of which may have different flow requirements.

A flow control valve 60 is shown in FIGS. 9–15 and forms a second form of the flow control valve of the present invention. The flow control valve 60 includes a central body 62 that is keystone shaped with three ports 64, 66 and 68 arranged in a planar Y orientation, with port 64 being a trunk port and ports 66 and 68 being branch ports. The central body 62 includes two planar sides 70 and two arcuate ends 72 and 74 that are on diametrically opposite sides of the body with reference to center Z of the body. Both arcuate ends 72 and 74 are centered at center Z and both have the same radius, but arc 74 is longer than arc 72. The ports 64–68 all have width dimensions measured along the arcuate ends between locations S, with the width dimensions of ports 66 and 68 being equal to each other and essentially half of the width of port 72. As will be understood from this disclosure, center Z forms a rotational axis and a shaft-accommodating hole P is located on this center Z.

Figure 13:
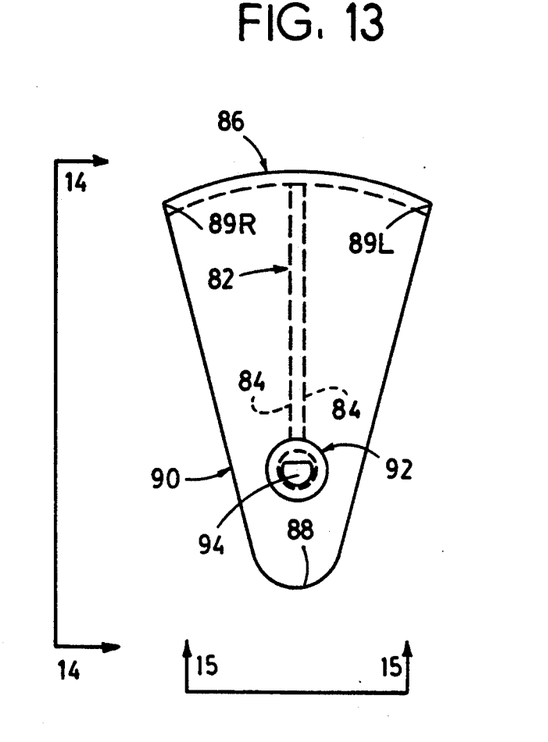
FIG. 13 is a top plan view of a second form of the flow control body of the present invention.
Figure 14:
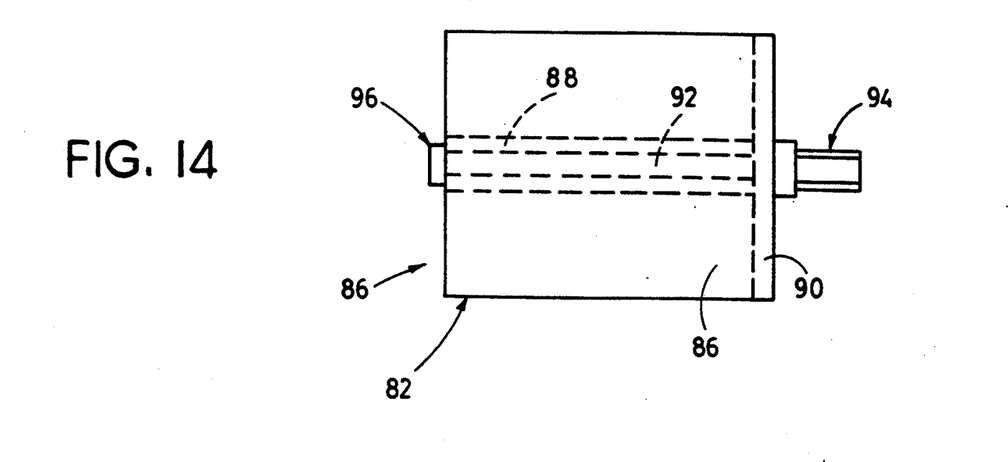
FIG. 14 is an elevational view of the FIG. 13 flow control body as seen in plane 14—14.
Figure 15:
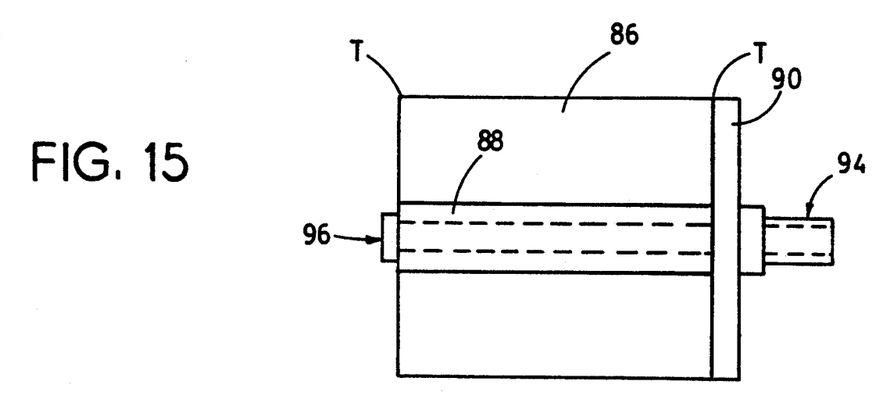
FIG. 15 is an elevational view of the FIG. 13 flow control body as seen in plane 15—15.
Figure 16:
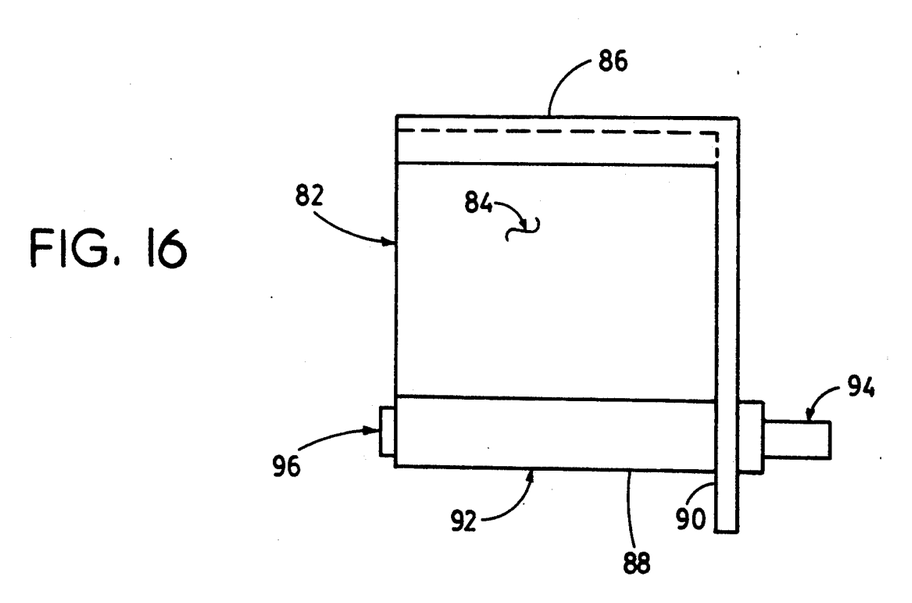
FIG. 16 is an elevational view of the FIG. 13 flow control body as seen in plane 16—16.

As shown in FIGS. 13–16, the flow control valve 60 includes a flow control means 80 for establishing fluid communication between the trunk port 64 and a selected one of the branch ports 66 and 68. The flow control means 80 includes a plate 82 that is similar to a blast deflection plate. The plate includes two planar sides 84 and two arcuate ends 86 and 88. The arcuate end 86 includes an arcuate plate that has a curvature that is sized and shaped to match the curvature of arced end 74 and has a width dimension measured between ends 89R and 89L that matches the width dimension of each branch port 66 and 68 as measured between locations S shown in FIG. 9 and a length dimension measured between locations T shown in FIG. 15 that matches the length dimension T'—T" shown in FIG. 10 whereby the arcuate end 86 will completely seal a branch port when that end is located over the branch port. It is noted that in the preferred form, the branch and trunk ports of this form of the flow control valve all have equal length dimensions. A similar relationship between the trunk and branch ports and between these ports and the first and second ports of the first form of the flow control valve exists as well. Such sealing will occlude the sealed branch port and prevent fluid from flowing through the sealed port. The arcuate end 88 is sized to permit fluid flow through the port 72 no matter what position the plate is in with respect to that port. Thus, orienting the plate 82 with arcuate end 86 occluding one of the branch ports 66 or 68 will establish fluid communication between trunk port 72 and the other branch port while preventing fluid communication between the trunk port and the covered branch port. The flow control means includes a wedge-shaped top plate 90 and a support shaft 92 having a top end 94 and a bottom end 96. The shaft can be D-shaped as above discussed and as best seen in FIG. 13.

The shaft is rotatably mounted to the body 62 to rotate in directions 98 with the shaft being received in shaft-accommodating hole P. Operation of the flow control means 60 is similar to the operation of the first form of the flow control means and thus will not be discussed.

It is understood that while certain forms of the present invention have been illustrated and described herein, it is not to be limited to the specific forms or arrangements of parts described and shown. It is also noted that each form of the flow control valve can include a planar top plate, such as plate 100 in FIG. 3 and plate 102 in FIG. 10. The plates 100 and 102 are releasably mounted on the body of the flow control valve to be removed when servicing of the valve is necessary.

I claim:

1. A flow control valve comprising:

A) a body having a hollow central section with a center, a trunk port fluidically connected to said central section, two branch ports fluidically connected to said central section, each of said branch ports having a width dimension and a length dimension through which fluid flows, said branch and trunk ports being oriented with respect to each other to form a Y shape with said branch ports being located adjacent to each other and said center being located between said branch ports and said trunk port, the trunk port intersecting said central section and forming an arcuate end at said intersection, said branch ports intersecting said central section and forming a single continuous arcuate end having a single curvature;

B) a flow control body positioned within said central section, said flow control body including a planar web plate having two sides and two ends, an arcuate plate on one of said two ends, said arcuate plate having a curvature equal to the curvature of said single continuous arcuate end and having a width equal to the width of each of said branch ports and further having a length equal to a length of each of said branch ports, a second one of said ends being located adjacent to said trunk port, said arcuate plate being located adjacent to said branch ports covering one of said branch ports when it is aligned with said one branch port to thereby occlude said one branch port while leaving the other branch port unobstructed, said flow control body further including a keystone shaped planar top plate on said planar web plate;

C) flow control body moving means for moving said flow control body between a first position in which said arcuate plate fluidically occludes a first one of said branch ports and a second position in which said arcuate plate fluidically occludes the other one of said branch ports.

2. The flow control valve defined in claim 1 wherein said flow control body further includes a rotation shaft connected to said top plate.

3. The flow control valve defined in claim 1 wherein said branch ports have equal length dimensions.

4. The flow control valve defined in claim 2 wherein said rotation shaft is D-shaped.

5. The flow control valve defined in claim 4 wherein said rotation shaft is located adjacent to said second one of the ends of said web plate.

6. The flow control valve defined in claim 5 wherein said web plate is centrally located on said top plate.

7. The flow control valve defined in claim 6 further including a sleeve on said web plate with said rotation shaft slidably received in said sleeve.

8. The flow control valve defined in claim 7 wherein said branch ports are spaced from each other along the single continuous curvature.

9. The flow control valve defined in claim 8 wherein said single continuous curvature has an arc length that exceeds the arc length of the arcuate intersection formed at the intersection of said trunk port and said central section.

10. The flow control valve defined in claim 9 wherein said single continuous curvature has an arc length that exceeds the total width of said branch ports.

* * * * *